US011942314B2

(12) United States Patent
Tagawa et al.

(10) Patent No.: US 11,942,314 B2
(45) Date of Patent: Mar. 26, 2024

(54) MASS SPECTROMETER AND MASS SPECTROMETRY METHOD

(71) Applicant: SHIMADZU CORPORATION, Kyoto (JP)

(72) Inventors: Yusuke Tagawa, Kyoto (JP); Yuki Ishikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 371 days.

(21) Appl. No.: 17/605,410

(22) PCT Filed: Jun. 6, 2019

(86) PCT No.: PCT/JP2019/022464
§ 371 (c)(1),
(2) Date: Oct. 21, 2021

(87) PCT Pub. No.: WO2020/245964
PCT Pub. Date: Dec. 10, 2020

(65) Prior Publication Data
US 2022/0216042 A1 Jul. 7, 2022

(51) Int. Cl.
*H01J 49/00* (2006.01)
*H01J 49/04* (2006.01)

(52) U.S. Cl.
CPC ...... *H01J 49/0036* (2013.01); *H01J 49/0468* (2013.01)

(58) Field of Classification Search
CPC .......................... H01J 49/0036; H01J 49/0468
(Continued)

(56) References Cited

U.S. PATENT DOCUMENTS 8,754,361 B1 * 6/2014 Rafferty ................ H01J 49/424 250/252.1
2011/0256551 A1 * 10/2011 Linder .............. B01L 3/502738 435/7.1
2019/0002977 A1 * 1/2019 Hess .................... A61K 31/155

FOREIGN PATENT DOCUMENTS

JP 2018-156879 A 10/2018

OTHER PUBLICATIONS

Yusuke Tagawa et al., "LC-MS Interface Parameter Optimization for High Sensitivity Measurement", Shimadzu Review, 2019, pp. 131-135, vol. 75, No. 3, 4.

(Continued)

*Primary Examiner* — Nicole M Ippolito
(74) *Attorney, Agent, or Firm* — Sughrue Mion, PLLC

(57) ABSTRACT

A mass spectrometer includes an ionization unit, a mass separation unit, a detection unit, a first measurement control unit configured to control the ionization unit to repeatedly execute a first measurement on a target sample while changing values of a plurality of parameters defined as device parameters, a second measurement control unit configured to control the ionization unit to set a value of each of the plurality of parameters to a predetermined reference value and execute a second measurement on the target sample at two or more time points before, after, or in a middle of repetition of the first measurement, a correction processing unit configured to correct results of the first measurements using results of the second measurements, and a device parameter-related information acquisition unit configured to determine the plurality of parameters using the corrected measurement results or acquire reference information for determining the plurality of parameters.

8 Claims, 6 Drawing Sheets

(58) Field of Classification Search
USPC .......................................... 250/281, 282, 283
See application file for complete search history.

(56) References Cited

OTHER PUBLICATIONS

Kevin Swersky et al., "Multi-Task Bayesian Optimization", NIPS Proceedings, Harvard University, 2013, 9 pages.
International Search Report of PCT/JP2019/022464 dated Sep. 3, 2019 [PCT/ISA/210].
Written Opinion of PCT/JP2019/022464 dated Sep. 3, 2019 [PCT/ISA/237].

* cited by examiner

MASS SPECTROMETER AND MASS SPECTROMETRY METHOD

CROSS REFERENCE TO RELATED APPLICATIONS

This application is a National Stage of International Application No. PCT/JP2019/022464 filed on Jun. 6, 2019.

TECHNICAL FIELD

The present invention relates to a mass spectrometer and a mass spectrometry method, and more particularly, to a mass spectrometer and a mass spectrometry method having a function of adjusting device parameters to optimal or nearly optical states based on actual measurement results.

BACKGROUND ART

In general, in order to perform highly accurate and highly sensitive measurement using an analyzer, it is necessary to appropriately set device parameters which determine analysis conditions in the analyzer. When a compound in a sample liquid eluted from a column of a liquid chromatograph unit is ionized in a liquid chromatograph mass spectrometer (LC-MS), an ion source by, for example, an electrospray ionization (ESI) method, an atmospheric pressure chemical ionization (APCI) method, or the like is used. In such an ion source, there are various device parameters such as the temperature of each component, an applied voltage, and a gas flowrate of a nebulizing gas or the like.

When the values of these parameters are changed in the LC-MS, ionization efficiency in the ion source, collection efficiency of ions generated in the ion source, and the like change, and signal intensity output from the ion detector also changes. Therefore, a conventional general LC-MS repeatedly measures a sample containing a target compound while changing the values of a plurality of device parameters one by one, and examines a change in signal intensity. The device parameters are adjusted so that, with each of the parameters, the signal intensity becomes as large as possible, that is, the detection sensitivity becomes as high as possible (see Patent Literature 1, for example).

In order to adjust the device parameters so that the detection sensitivity is maximized by the method as described above, it is necessary to set the change width of the value of each parameter as small as possible and to perform the exhaustive measurement in which the measurement is repeated while all the parameters are comprehensively changed. However, with such an exhaustive measurement, the total number of measurements is so large that it takes long time to complete all measurements. In particular, a parameter whose physical quantity is temperature is different from a parameter whose physical quantity is voltage or gas flowrate, since it takes time to change the temperature from one value to the next value and stabilize there. Therefore, a waiting time between measurements is long, and a total measurement time tends to be long. For example, in the LC-MS, if the exhaustive measurements are performed in order to fully adjust the device parameters, measurements may be repeated for a period of time exceeding one day. When the number of measurements increases and the total measurement time becomes longer as described above, the following problems arise.

CITATION LIST

Patent Literature

Patent Literature 1: JP 2018-156879 A

Non Patent Literature

Non Patent Literature 1: Tagawa, et al., "LC-MS Interface Parameter Optimization for High Sensitivity Measurement", Shimadzu Review, Vol. 75, No. 3.4, March 2019

Non Patent Literature 2: K. Swersky and two others, "Multi-Task Bayesian Optimization", [online], [searched on Apr. 17, 2019], NIPS, 2013, Internet

SUMMARY OF INVENTION

Technical Problem

In the exhaustive measurement by the LC-MS, when the value of a certain parameter among a plurality of device parameters is changed, it is assumed that other parameters and the state of the device do not change (or the change is negligibly small). However, when measurement is performed for a long time, the measured signal intensity may change due to factors other the device parameters, such as a change in a component of a mobile phase used in a liquid chromatograph (LC) or deterioration in a sample. As described above, when there is a temporal change in the signal intensity due to a factor other than the parameter to be changed, the accuracy of adjustment of the device parameters based on the actual measurement result decreases, and there is a possibility that measurement with high sensitivity cannot be performed.

The above problem persists not only in a case where the device parameters are determined on the basis of the result of exhaustive measurements, but also in a case where the device parameters are optimized using data measured in advance as prior knowledge. As disclosed in Non-Patent Literature 1, the present applicant has proposed a method using a multi-task Bayesian optimization method as a method for efficiently automatically adjusting device parameters. However, in the multi-task Bayesian optimization method, a similar model for estimating a model posterior distribution is required as prior knowledge. This similar model is a sensitivity model representing the relationship between the values of a plurality of parameters and sensitivity. In order to create a sensitivity model, however, it is necessary to perform many measurements while changing parameter conditions, which causes a problem due to an increase in measurement time.

The present invention has been made to solve the above problems and an object is to provide a mass spectrometer and a mass spectrometry method which can perform highly accurate parameter adjustment, even when repetition of measurements accompanied by a change in parameter value takes a long time and the temporal change in signal intensity due to various factors cannot be ignored, by reducing or substantially eliminating the influence of such a temporal change in signal intensity.

Solution to Problem

One aspect of a mass spectrometer according to the present invention is a mass spectrometer including an ionization unit, a mass separation unit, and a detection unit, the mass spectrometer including:

- a first measurement control unit configured to control the ionization unit, the mass separation unit, and the detection unit so as to repeatedly execute a first measurement on a target sample while changing values of a plurality of parameters defined as device parameters;
- a second measurement control unit configured to control the ionization unit, the mass separation unit, and the detection unit so as to set a value of each of the plurality of parameters to a predetermined reference value and execute a second measurement on the target sample at not less than two time points before, after, or in a middle of repetition of the first measurement;
- a correction processing unit configured to correct results of the first measurements by using results of the second measurements executed at not less than two time points; and
- a device parameter-related information acquisition unit configured to determine the plurality of parameters using the measurement results corrected by the correction processing unit or acquire reference information for determining the plurality of parameters.

One aspect of a mass spectrometry method according to the present invention is a mass spectrometry method uses a mass spectrometer including an ionization unit, a mass separation unit, and a detection unit, the mass spectrometry method including:

- a first measurement step of repeatedly executing a first measurement on a target sample while changing values of a plurality of parameters defined as device parameters;
- a second measurement step of setting a value of each of the plurality of parameters to a predetermined reference value and executing a second measurement on the target sample at not less than two time points before, after, or in a middle of repetition of the first measurement;
- a correction processing step of correcting results of the first measurements by using results of the second measurements executed at not less than two time points; and
- a device parameter-related information acquisition step of determining the plurality of parameters using the measurement results corrected in the correction processing step or acquiring reference information for determining the plurality of parameters.

In this case, "not less than two time points before the start, after the end, or in the middle of repetition of the first measurement" can include two time points before the start and after the end, two time points before the start and in the middle, two time points in the middle and after the end, and two time points in the middle that are different from each other.

The term "mass spectrometry" as used in this case includes MS/MS analysis and $MS^n$ analysis with n being 3 or more.

Advantageous Effects of Invention

In the mass spectrometer according to an aspect of the present invention, under the control of the second measurement control unit, the value of each parameter is always set to a reference value, and measurements for the same target sample are executed. Therefore, a temporal change of a factor or factors other than the each parameter included in the device parameters affects the measurement result. Accordingly, the correction processing unit uses the results of the second measurements to perform correction for removing the influence of the temporal change in the measurement results obtained by repeating the first measurement. Based on the corrected measurement results, the device parameter-related information acquisition unit, for example, determines the device parameters or obtains reference information for determining the device parameters. The reference information is, for example, a sensitivity model used when device parameters are adjusted using the above-described multi-task Bayesian optimization method.

According to the mass spectrometer and the mass spectrometry method according to one aspect of the present invention, even in a case where the first measurement is repeated for a long time and a temporal change in signal intensity due to various factors cannot be ignored, it is possible to reduce or substantially eliminate the influence of such a temporal change and obtain device parameters that allows highly sensitive measurement. In addition, according to the mass spectrometer and the mass spectrometry method according to one aspect of the present invention, since the accuracy of the reference information for determining the device parameters can be improved, the number of repetitions of measurement can be reduced when determining the device parameters by repetition of measurement based on the reference information. That is, it is possible to efficiently obtain device parameters allowing highly sensitive measurement.

DESCRIPTION OF EMBODIMENTS

An LC-MS which is an embodiment of a mass spectrometer according to the present invention will be described with reference to the accompanying drawings.

Overall Configuration of LC-MS of Present Embodiment

Figure 1:
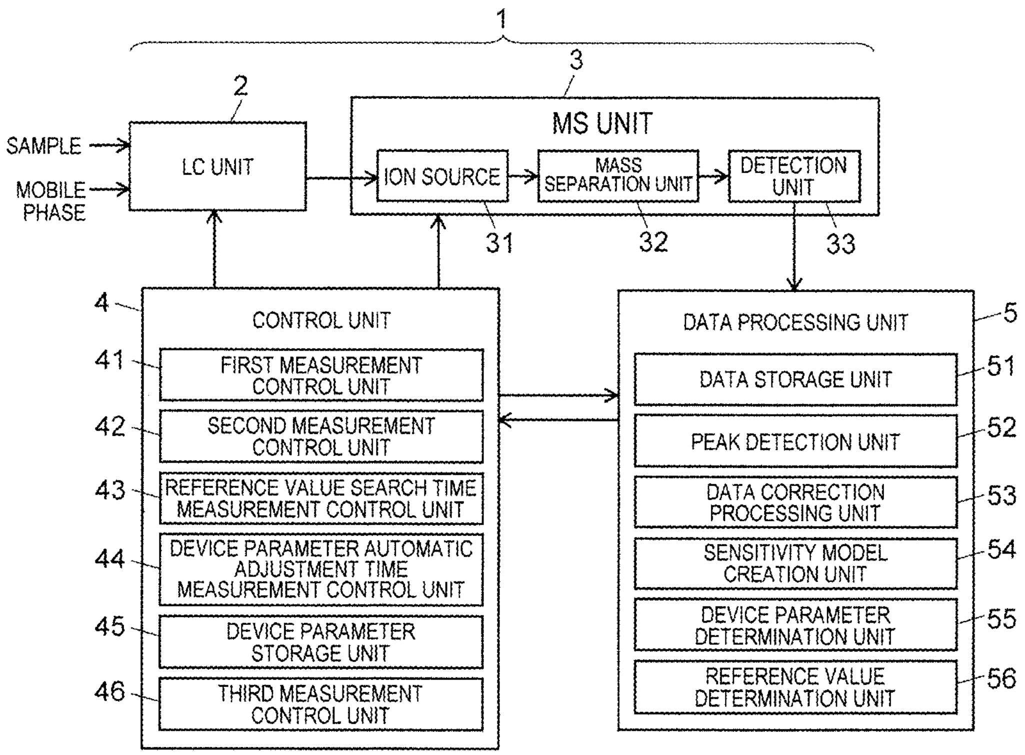
FIG. 1 is a schematic block configuration diagram of an LC-MS according to an embodiment of the present invention.

FIG. 1 is a schematic block configuration diagram of an LC-MS according to the present embodiment.

Referring to FIG. 1, a measurement unit 1 includes a liquid chromatograph unit (LC unit) 2 and a mass spectrometry unit (MS unit) 3. The mass spectrometry unit 3 includes an ion source 31, a mass separation unit 32, and a detection unit 33.

Although not illustrated, the liquid chromatograph unit 2 includes a liquid feeding pump, an injector, and a column, injects a predetermined amount of sample from the injector into the mobile phase fed by the liquid feeding pump, and feeds the sample into the column on the flow of the mobile phase. Various components (compounds) in the sample are temporally separated while passing through the column, eluted from the column outlet, and introduced into the mass spectrometry unit 3. In the mass spectrometry unit 3, the ion source 31 ionizes components in the eluate from the column, and the mass separation unit 32 separates various generated ions according to the mass-to-charge ratio m/z. The detection unit 33 detects ions separated according to the mass-to-charge ratio and generates a detection signal according to the amount of ions.

A control unit 4 controls the operation of the measurement unit 1, and includes functional blocks such as a first measurement control unit 41, a second measurement control unit 42, a reference value search time measurement control unit 43, a device parameter automatic adjustment time measurement control unit 44, a device parameter storage unit 45, and a third measurement control unit 46. A data processing unit 5 receives data obtained by the measurement unit 1 and performs various data processing. The data processing unit 5 includes functional blocks such as a data storage unit 51, a peak detection unit 52, a data correction processing unit 53, a sensitivity model creation unit 54, a device parameter determination unit 55, and a reference value determination unit 56.

Usually, most of the functional blocks of the control unit 4 and the data processing unit 5 can be implemented by using a personal computer as a hardware resource and executing dedicated control/processing programs installed in the computer on the computer.

Figure 2:
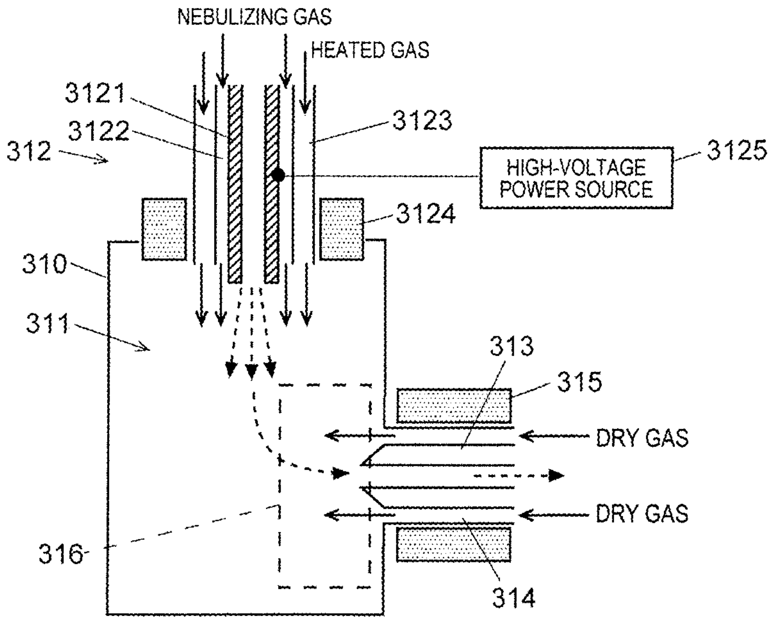
FIG. 2 is a schematic configuration diagram of an ionization unit in the LC-MS according to the present embodiment.

Configuration and Schematic Operation of Ion Source in LC-MS According to Present Embodiment FIG. 2 is a schematic configuration diagram of the ion source 31 in the LC-MS according to the present embodiment. The ion source 31 is an ESI ion source and includes an ESI probe 312 that ionizes components in the eluate in an ionization chamber 311 that is a substantially atmospheric pressure atmosphere formed inside the chamber 310. The ESI probe 312 includes a capillary 3121 through which an eluate flows, a nebulizing gas tube 3122 disposed so as to surround the capillary 3121, a heating gas tube 3123 disposed so as to surround the nebulizing gas tube 3122, an interface heater 3124 that heats the distal end portion of the ESI probe 312, and a high-voltage power supply 3125 that applies a high voltage to the capillary 3121. The ionization chamber 311 and a next-stage intermediate vacuum chamber (not illustrated) communicate with each other through a desolvation tube 313. A dry gas tube 314 for ejecting a dry gas into the ionization chamber 311 is disposed around the desolvation tube 313. The desolvation tube heater 315 heats the desolvation tube 313, and the block heater 316 heats the entire ionization chamber 311.

The ion generating operation of the ion source 31 will be briefly described.

When the eluate containing a sample component reaches the vicinity of the distal end of the capillary 3121, a biased charge is applied to the eluate by a DC electric field formed by a high voltage (about several kV at the maximum) applied from the high-voltage power supply 3125 to the capillary 3121. The charged eluate is nebulized as fine droplets (charged droplets) into the ionization chamber 311 with the aid of the nebulizing gas ejected from the nebulizing gas tube 3122. The nebulized droplets come into contact with gas molecules in the ionization chamber 311 and are split and refined. Since the temperature inside the ionization chamber 311 is high, the solvent in the droplets is vaporized. In addition, since the heating gas ejected from the heating gas tube 3123 flows so as to surround the nebulizing flow, the vaporization of the solvent from the droplets is promoted, and the spread of the nebulizing flow is suppressed. In the process of vaporization of the solvent from the droplet, the component molecules in the droplet have charges and jump out from the droplet to become gas ions.

Since there is a pressure difference between both opening ends of the desolvation tube 313, a gas flow sucked into the desolvation tube 313 from the inside of the ionization chamber 311 is formed. The charged droplets in which the ions and the solvent derived from the sample component generated from the nebulizing flow from the distal end of the capillary 3121 are not completely vaporized are carried by the gas flow and sucked into the desolvation tube 313. Since a dry gas is ejected from the dry gas tube 314 around the inlet opening of the desolvation tube 313, the solvent from the charged droplets further vaporizes by being exposed to the dry gas. Furthermore, since the desolvation tube 313 is heated to a high temperature by the heater 315, the vaporization of the solvent from the charged droplets also proceeds in the desolvation tube 313. As a result, ions derived from the sample component are efficiently generated and sent to the intermediate vacuum chamber on the next stage.

The ion source 31 has the following seven parameters as device parameters that influence ionization efficiency and ion collection efficiency.

- Temperature of interface heater 3124 (to be sometimes abbreviated as "IFT" hereinafter)
- Temperature of block heater 316 (to be sometimes abbreviated as "HB" hereinafter)
- Temperature of desolvation tube heater 315 (to be sometimes abbreviated as "DL" hereinafter)
- Voltage applied to capillary 3121 (to be sometimes abbreviated as "IFV" hereinafter)
- Flowrate of nebulizing gas (to be sometimes abbreviated as "Neb" hereinafter)
- Flowrate of heating gas (to be sometimes abbreviated as "HeaGas" hereinafter)
- Flowrate of dry gas (to be sometimes abbreviated as "DryGas" hereinafter)

When the values of the seven parameters are changed, the ionization efficiency and/or the ion collection efficiency changes, the amount of ions provided for mass spectrometry changes, and the detection sensitivity (signal intensity) in the detection unit 33 also changes. Since the degree of change in detection sensitivity and the direction of change depend on the component (compound), it is necessary to optimize the parameter value for each compound in order to perform highly sensitive measurement.

A device parameter adjustment method and procedure in the LC-MS according to the present embodiment will be described next.

Device Parameter Adjustment Method in LC-MS According to Present Embodiment

The LC-MS according to the present embodiment has a function of automatically adjusting device parameters including the above-described seven parameters. For automatic adjustment of device parameters, a technique using a multi-task Bayesian optimization method as disclosed in Non-Patent Literature 1 is used. In order to optimize a device parameter by the multi-task Bayesian optimization method, a sensitivity model indicating the relationship between parameter values and detection sensitivity is required. The higher the accuracy of the sensitivity model, the smaller the number of times to search for an optimal device parameter, that is, the number of times of repetition of measurement at the time of automatic parameter adjustment. In order to create a highly accurate sensitivity model, it is necessary to repeatedly perform measurement on a target compound while exhaustively changing all of the seven parameters to obtain signal intensity. Such exhaustive measurement requires a long time, but in the LC-MS according to the present embodiment, the above-described problem associated with a long total measurement time is solved by the characteristic measuring operation and processing described below.

Figure 3:
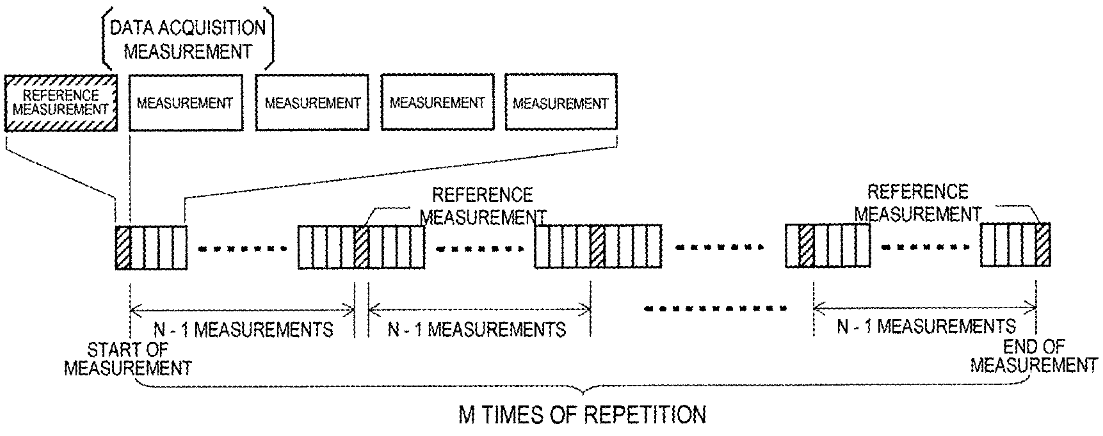
FIG. 3 is a schematic timing chart of exhaustive measurement in the LC-MS according to the present embodiment.

FIG. 3 is a schematic timing chart of exhaustive measurement for data collection for creating a sensitivity model in the LC-MS according to the present embodiment. Referring to FIG. 3, "measurement" indicates a period of measurement (to be sometimes referred to as a "measurement for data collection hereinafter" in order to distinguish it from a reference measurement described later hereinafter) for the target compound executed under one combination of the values of the seven parameters. Since the repetition of N−1 times of data collection measurement is measurement of the values of 7 parameters under N−1 different combinations and is performed M times, measurement of the values of 7 parameters under (N−1)×M different combinations is performed. Reference measurement is executed once before the start and after the end of all the measurements including the (N−1)×M repetitions of the measurement for data collection and between each repetition of (N−1) times of measurement and the next repetition of the (N−1) times of measurement, which corresponds to a midway timing in all the measurements.

A reference measurement is a measurement executed on a target compound after the values of the seven parameters are respectively set to predetermined reference values. That is, since a plurality of reference measurements are executed under exactly the same conditions for the seven parameters, if conditions other than the seven parameters and the state of the device are exactly the same, ideally, the measurement results should be the same except for errors due to, for example, restrictions on the accuracy of the device. On the other hand, when there is a difference between measurement results in a plurality of reference measurements, it can be estimated that the main factor is a variation in conditions other than the seven parameters and the state of the device. More specifically, main factors considered as such factors are temporal changes in components of the mobile phase used in the liquid chromatograph unit 2, deterioration in the sample, and the like.

Figure 4:
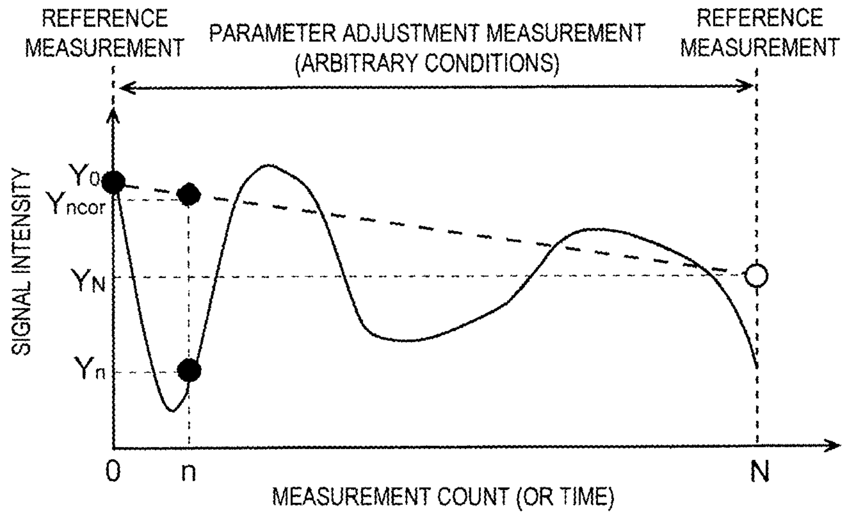
FIG. 4 is an explanatory diagram of a data correction method in the LC-MS according to the present embodiment.

Accordingly, based on the measurement results on a plurality of reference measurements for the same target compound, specifically, the change (difference) in signal intensity in the mass-to-charge ratio corresponding to the target compound, data correction is performed to reduce errors due to variations in conditions other than the seven parameters and the state of the device included in the signal intensity data in the mass-to-charge ratio corresponding to the target compound acquired in the measurement for data collection. FIG. 4 is an explanatory diagram of the data correction method.

<Method for Correcting Signal Intensity Data>

Referring to FIG. 4, the 0th and the Nth among the number of times of measurement on the abscissa are timings at which reference measurement is executed. On the other hand, during the period between the first time and the Nth−1 time, the data collection measurement is performed N−1 times. The ordinate represents the signal intensity at the mass-to-charge ratio corresponding to the target compound. During the period from the first time to the Nth−1 time, the signal intensity changes because the values of the seven parameters change at each measurement time. On the other hand, since the values of the seven parameters are the same at the time point 0 and the time point N, the signal intensity should be the same originally, but there is a difference in value between $Y_0$ at the time point 0 and $Y_N$ at the time point N−1.

An error caused by a variation in condition other than the seven parameters or the state of the device can be regarded as monotonically increasing (or decreasing) with respect to a time change. Accordingly, a correction equation formula in the form of equation (1) given below is used.

$$Y_{correct}=Y_n\times(Y_{ref}/Y_{ncor})=Y_n\times[NY_{ref}/\{(N-n)Y_0+nY_N\}] \quad (1)$$

In this case, as illustrated in FIG. 4, $Y_n$ and $Y_{ncor}$ respectively represent measured signal intensity at the time of the nth data collection measurement and signal intensity assumed under a reference condition. Note that $Y_{ref}$ is an appropriately determined reference value for correction, and for example, $Y_0$ may be set as $Y_{ref}$.

That is, the signal intensity obtained in the N−1 times of data collection measurement is corrected according to the correction formula in the form of equation (1) using the signal intensity obtained in the reference measurement performed immediately before and immediately after the N−1 times of repetition of the data collection measurement. With this correction, it is possible to reduce errors due to variations in conditions other than the seven parameters and the state of the device.

<Method for Determining Reference Condition During Reference Measurement>

The values of the seven parameters at the time of the reference measurement, that is, reference conditions can be determined by the following procedure.

Step 1: Parameters whose physical quantities are temperatures, specifically, three parameters, namely the temperature of the interface heater 3124, the temperature of the block heater 316, and the temperature of the desolvation tube heater 315, are monotonously changed from low to high or from high to low within a settable range, and a signal intensity at a mass-to-charge ratio corresponding to the target compound is acquired under a combination of different temperatures. A parameter other than the parameters whose physical quantities are temperatures may be a predetermined default value. In addition, the three parameters related to the temperatures do not need to be changed in very small steps and may be changed in large steps that divide the settable range into five. In addition, since the three parameters related to temperatures have a positive correlation with each other, it is not necessary to exhaustively change the values of the parameters, and it is sufficient to acquire signal intensity for a combination of temperatures of about five stages with the three parameters related to the temperatures as one set.

Step 2: Among the signal intensities desired to be acquired in step 1, a combination of values of three parameters related to the temperatures at which the signal intensity is maximum is selected, and is determined as a reference value in the three parameters.

Step 3: When it is desired to obtain higher detection sensitivity, a parameter regarding the voltage applied to the capillary 3121 is monotonously changed from low to high or from high to low within a settable range, and signal intensity for each voltage is acquired. The value of the parameter related to the temperature at this time may be the reference value determined in step 2. The values of the other parameters may be default values. In general, it is not necessary to adjust parameters related to the voltage applied to the capillary 3121.

Step 4: The value of the parameter of the applied voltage which has the maximum signal intensity is selected from the signal intensities desired to be acquired in step 3, and the selected value is determined as the reference value in the parameter.

Step 5: Default values are used as values of the three parameters related to the gas flowrate, and the parameter values determined in steps 2 and 4 are used as reference values. When steps 3 and 4 are omitted, the parameter value of the applied voltage may also be a default value.

The reason for adopting the procedure as described above is that parameters that greatly contribute to ionization efficiency are parameters related to temperature and parameters of the voltage applied to the capillary 3121. If a parameter related to a temperature is not adjusted, the influence of the measurement condition in the measurement performed immediately before reference measurement greatly appears, and the measurement under the reference condition becomes unstable.

The following will describe the comparison result of a change in the signal intensity in repeated measurement in a case where the parameters related to temperature is not adjusted as a reference condition and a case where the parameters related to the temperature is adjusted as a reference condition as described above.

(1) Case where Adjustment of Parameters Related to Temperature is not Performed as Reference Condition The reference conditions at the time of reference measurement are fixed as follows:

$DL$=250° C.,$HB$=400° C.,$IFT$=300° C.,$IFV$=3.4 $kV$(for positive $ion$ measurement; −3.4 $kV$ for negative $ion$ measurement),$Neb$=2.6 L/min,HeaGas=10.0 L/min, and DryGas=10.0 L/min.

On the other hand, parameters at the time of measurement for data collection are as follows.

The three parameters related to temperature are presented in the form of the following five sets:

Temperature set 1: DL=100° C., HB=100° C., IFT=100° C.

Temperature set 2: DL=150° C., HB=200° C., IFT=170° C.

Temperature set 3: DL=200° C., HB=300° C., IFT=240° C.

Temperature set 4: DL=250° C., HB=400° C., IFT=300° C.

Temperature set 5: DL=300° C., HB=500° C., IFT=400° C.

In addition, IFV, Neb, HeaGas, and DryGas are fixed to default values within settable ranges of the device. For example, IFV and Neb are respectively fixed to 5.0 kV and 3.0 L/min, and both HeaGas and DryGas are fixed to 10.0 L/min.

Figure 5:
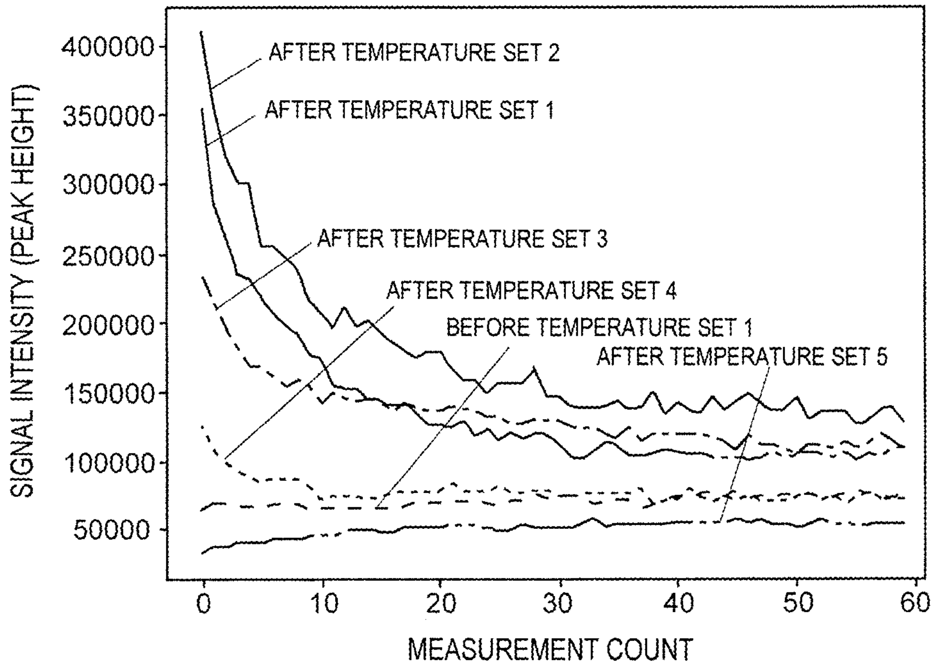
FIG. 5 is a diagram illustrating the relationship between the number of measurements and signal intensity in a case where a temperature parameter under a reference condition is not adjusted.

FIG. 5 illustrates the result of executing reference measurement 60 times under the above reference condition while repeating the data collection measurement under each parameter for the data collection measurement and plotting changes in signal intensity obtained for the target compound in the reference measurement with respect to the number of measurements. Obviously from FIG. 5, the change in signal intensity with the increase in the number of times of measurements greatly varies depending on the temperature set of the immediately preceding measurement for data collection. Obviously, at the same time, in a case where the temperature set for measurement for data collection is changed in the order of 1→2→ . . . →5, the value of the signal intensity in the reference measurement originally monotonically increases or monotonically decreases in this order, whereas the magnitude of the signal intensity value is reversed. This means that the premise of correction formula (1) described above is not necessarily satisfied, and sufficient correction cannot be performed.

Figure 6:
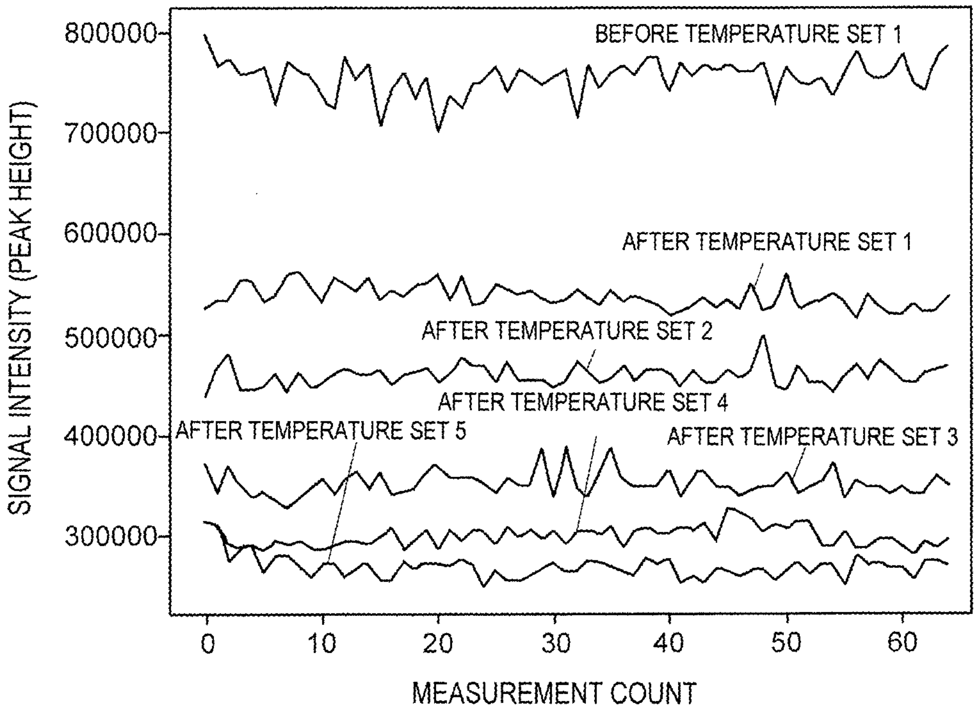
FIG. 6 is a diagram illustrating the relationship between the number of measurements and signal intensity in a case where a temperature parameter under a reference condition is properly adjusted.

(2) Case where Adjustment of Parameters Related to Temperature is Performed as Reference Condition FIG. 6 is a diagram illustrating the relationship between the number of times of measurement and signal intensity when the parameters related to the temperature for the reference measurement are adjusted as described above. As can be seen from FIG. 6, in this case, the influence of the measurement condition (temperature set) immediately before the reference measurement is hardly observed. In addition, while the temperature set in the measurement for data collection is changed in the order of 1→2→ . . . →5, the signal intensity value in the reference measurement decreases in the same order. That is, the signal intensity value monotonously decreases with time, and it is possible to accurately correct the signal intensity in the measurement for data collection using the signal intensity obtained by the reference measurement.

The above results reveal the importance of appropriately determining parameters related to temperature as a reference condition for reference measurement.

Operation During Parameter Adjustment in LC-MS According to Present Embodiment An operation in adjusting a device parameter in the LC-MS according to the present embodiment will be described next. The sensitivity model used for automatic adjustment of device parameters is created as follows.

First, under the control of the reference value search time measurement control unit 43, the measurement unit 1 performs measurement on a sample containing a target compound under the conditions described in step 1 (and step 3). In the data processing unit 5, the peak detection unit 52 detects a peak corresponding to the target compound on a chromatogram created based on the obtained data. Then, the height or the area of the peak is calculated and used as a signal intensity value. The reference value determination unit 56 compares a plurality of signal intensity values obtained under different conditions and determines a parameter value having the maximum signal intensity as a reference value.

Thereafter, the measurement unit 1 repeatedly executes data collection measurement on a sample containing the target compound under the control of the first measurement control unit 41. In addition, under the control of the second measurement control unit 42, the measurement unit 1 executes reference measurement on a sample containing a target compound at an appropriate time point before, after, or in the middle of the repetition of measurement for data collection. Data obtained by the device data collection measurement and the reference measurement is stored in the data storage unit 51.

The peak detection unit 52 detects a peak corresponding to a target compound on a chromatogram created based on data obtained for each measurement and calculates the height or area of the peak to obtain a signal intensity value. The data correction processing unit 53 executes the data correction described above on the signal intensity value obtained by the data collection measurement using the signal intensity value obtained by the reference measurement and obtains a corrected signal intensity value. This data correction reduces the influence of changes in the state of the device other than the device parameters.

The sensitivity model creation unit 54 creates a sensitivity model based on the corrected signal intensity value measured while the value of the parameter is variously changed. As described above, the multi-task Bayesian optimization method is used when device parameters are automatically adjusted. In the multi-task Bayesian optimization method, the posterior distribution of a model function of a system to be optimized is generally estimated based on reference observation data and target observation data. The target observation data is data including the observation value obtained in the system to be optimized, whereas the reference observation data is data including the observation value obtained in a reference system different from but similar to the system to be optimized. The sensitivity model corresponds to this reference observation data and indicates the relationship between the value of each parameter and signal intensity (detection sensitivity) as will be exemplified later. The sensitivity model created by the sensitivity model creation unit 54 is transferred to the control unit 4 and stored in the device parameter automatic adjustment time measurement control unit 44.

In the multi-task Bayesian optimization method adopted in the LC-MS according to the present embodiment, the posterior distribution of the model function is estimated under the assumption that the model function of the system follows a certain stochastic process. The stochastic process at the time of creating a sensitivity model may be a Gaussian process regression so that a secondary effect of suppressing the influence of observation noise can be obtained.

When the automatic adjustment of the device parameters is actually executed, the device parameter automatic adjustment time measurement control unit 44 repeats the measurement on the sample containing the target compound while controlling the measurement unit 1 to automatically change the device parameter in the measurement to be performed next according to the algorithm of the multi-task Bayesian optimization method using the sensitivity model. The multi-task Bayesian optimization method is described in detail in Non-Patent Literature 2 and the like, and the algorithm itself is not the gist of the present invention. Accordingly, a description of this algorithm will be omitted. Using the multi-task Bayesian optimization method makes it possible to search for a device parameter in a nearly optimal state with a small number of times of measurement. In addition, as described above, since the accuracy of data used when creating the sensitivity model is high (the influence of changes in measurement conditions other than the device parameters and the device state is reduced), the accuracy of the sensitivity model itself is also high. Therefore, the number of times of measurement at the time of searching for a device parameter based on the multi-task Bayesian optimization method that refers to a sensitivity model is also reduced accordingly.

The device parameter determination unit 55 determines, as a device parameter, each parameter value when a predetermined condition is satisfied and the repetition of measurement ends. The determined device parameter is stored in the device parameter storage unit 45 of the control unit 4. At the time of subsequent measurement of the target compound, highly sensitive measurement can be performed by using the device parameter. That is, the third measurement control unit 46 reads out a device parameter from the device parameter storage unit 45 and controls the measurement unit 1 according to the parameter to execute measurement.

[Effect of Signal Intensity Data Correction]

In order to confirm the effect of correcting the signal intensity data obtained in the data collection measurement using the signal intensity data obtained in the reference measurement, the amount of variation in signal intensity when three measurements were performed was examined for six compounds. The six compounds were Reserpine, Acetaminophen, Naproxen, Warfarin, Carbamazepine, and Estrone, but they were treated as different compounds since Warfarin is ionizable in both positive and negative ion modes.

Table 1 indicates the calculation result of the variation amount of the signal intensity value in the presence or absence of the signal intensity data correction.

TABLE 1

| | Positive Mode | | | | Negative Mode | | |
|---|---|---|---|---|---|---|---|
| | Res. | War.+ | Ace. | Car. | Nap. | Est. | War.− |
| Without Correction | 31.1% | 5.6% | 8.4% | 6.1% | 35.2% | 39.5% | 29.8% |
| With Correction | 6.5% | 4.1% | 6.2% | 3.8% | 12.0% | 23.2% | 18.2% |

From Table 1, it can be confirmed that a change in signal intensity over time is sufficiently reduced by the correction of the signal intensity data.

In addition, in order to confirm the effect of correcting signal intensity data in automatically adjusting device parameters, the following comparison experiment was performed.

More specifically, sensitivity models were created for a case where the signal intensity data was corrected and a case where the signal intensity data was not corrected (prior art), and the device parameters were adjusted by the multi-task Bayesian optimization method using the sensitivity models as reference information.

Figure 7:
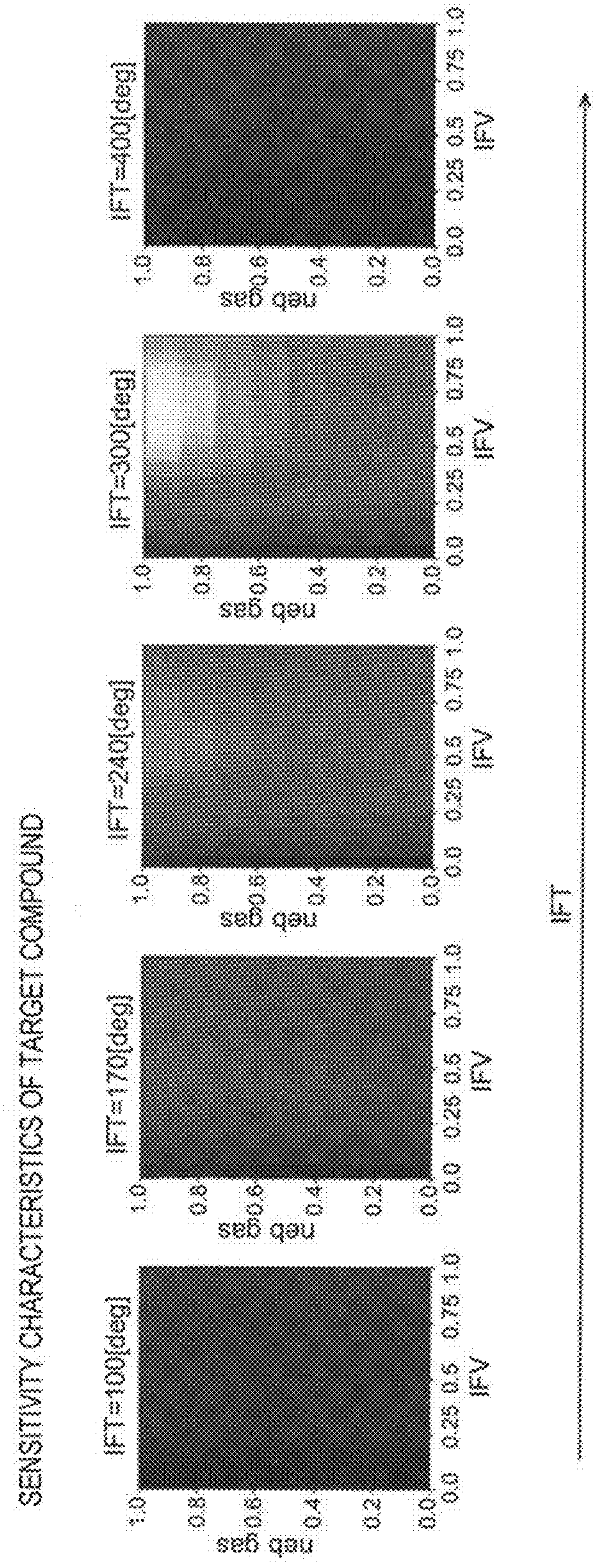
FIG. 7 is a diagram illustrating an example of a sensitivity model of a compound to be optimized.

FIG. 7 illustrates the sensitivity characteristics of a compound (ketoprofen) for which device parameters are to be optimized. The following are three parameters of the device parameters:

IFT: The range of 100° C. to 400° C. is changed in 25° C. steps. Total 13 steps.

IFV: The range of 0.2 kV to 5.0 kV is changed in 0.2 kV steps. Total 17 steps.

Neb: The range of 1.5 L/min to 3.0 L/min is changed in 0.3 L/min steps. Total 17 steps.

Other parameters may be default values.

Figures 8A, 8B:
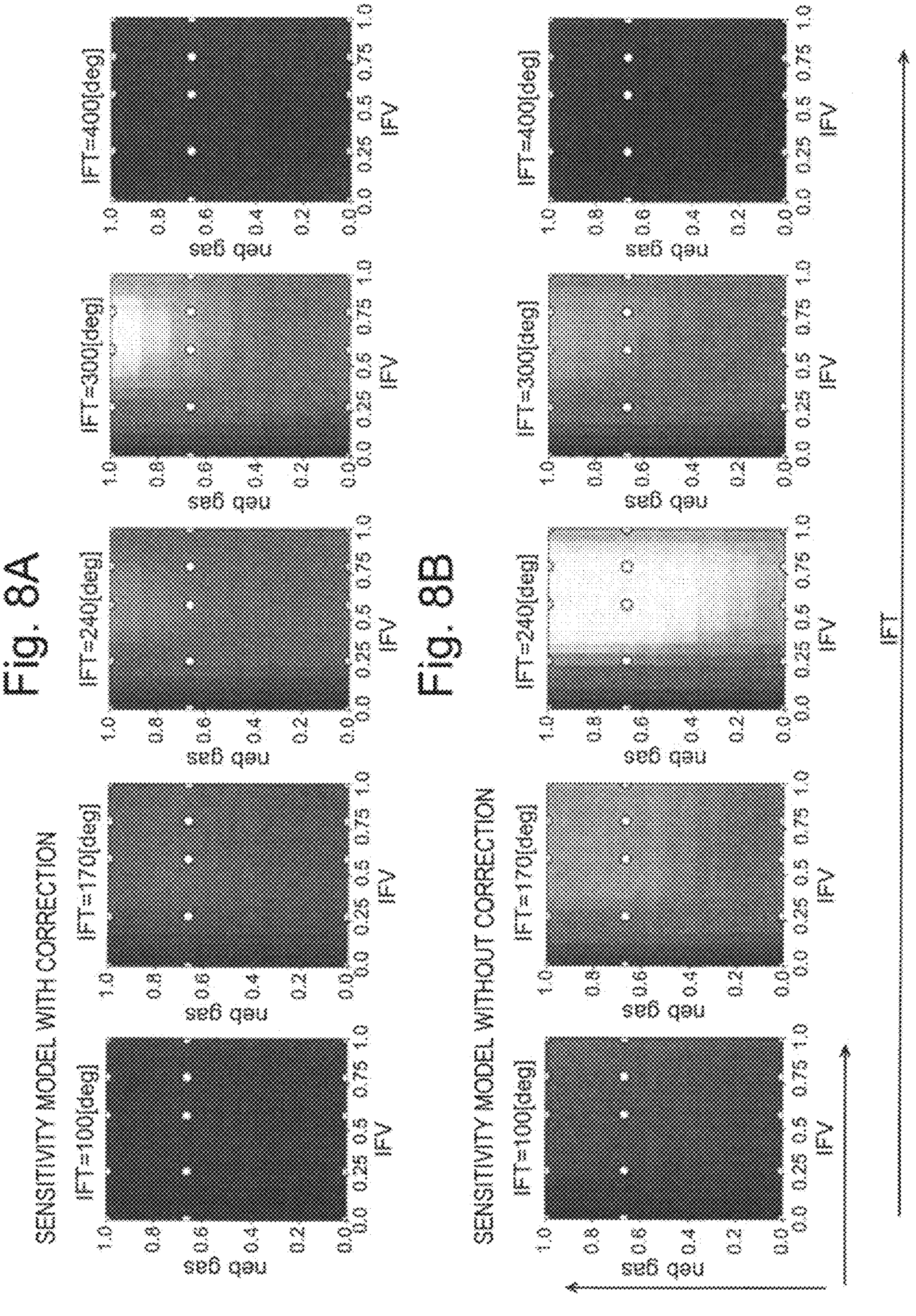
FIGS. 8A and 8B are diagrams illustrating an example of each of sensitivity models in a case with correction and in a case without correction.

FIG. 8A illustrates a sensitivity model corresponding to the above compound when the signal intensity data is corrected. FIG. 8B illustrates a sensitivity model corresponding to the above compound when the signal intensity data is not corrected. The following are three parameters among the device parameters at the time of measurement for data collection for creating these sensitivity models:

IFT: Five steps of 100° C., 170° C., 240° C., 300° C., and 400° C.

IFV: Five steps of 0.2 kV, 1.5 kV, 3.0 kV, 4.0 kV, and 5.0 kV.

Neb: Three steps of 1.5 L/min, 2.5 L/min, and 3.0 L/min.

When the sensitivity models in FIGS. 8A and 8B are compared with the sensitivity characteristic in FIG. 7, it can be seen that FIG. 8A in which the signal intensity data is corrected is closer to the original sensitivity characteristic.

Figure 9:
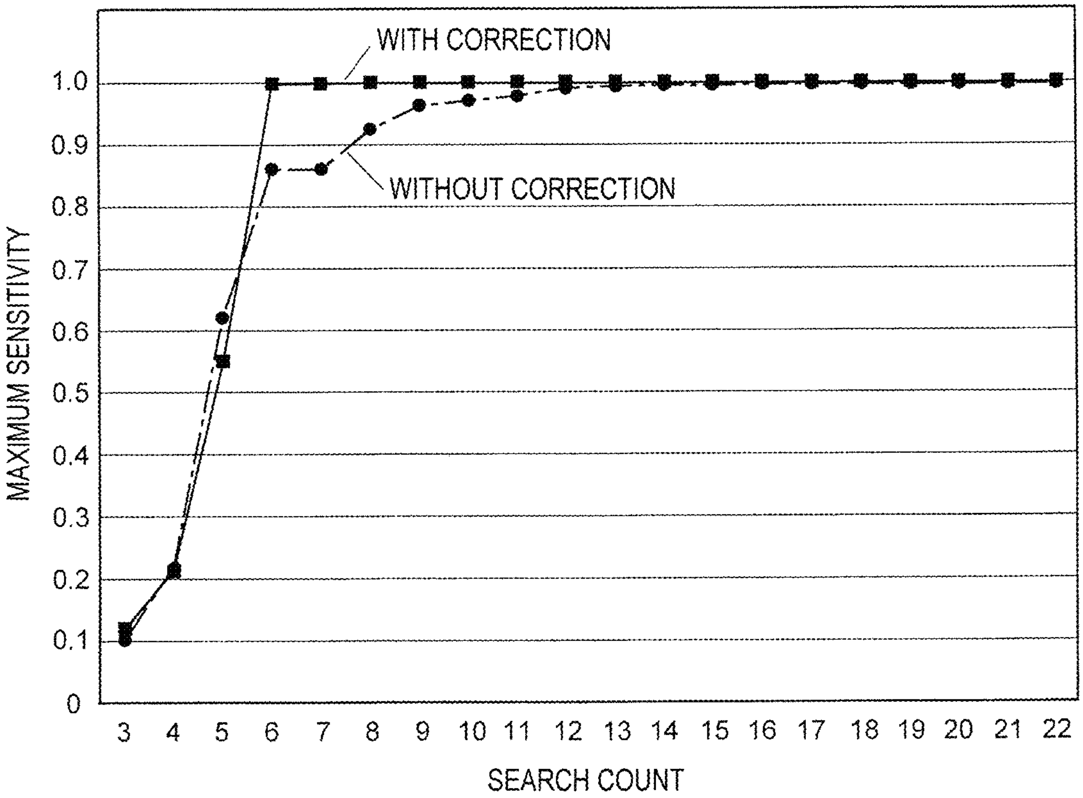
FIG. 9 is a diagram illustrating the relationship between the number of searches and sensitivity when device parameter adjustment is performed by a multi-task Bayesian method using sensitivity models with and without correction.

After three initial points are randomly determined on the sensitivity model, the maximum signal intensities and the numbers of times of measurement obtained when 19 points are searched are compared. FIG. 9 illustrates the relationship between the number of searches and the average value of the maximum sensitivities when the search is performed with the number of trials of 20.

As can be seen from FIG. 9, when the sensitivity model using the corrected signal intensity data was used as reference information, the condition (parameter value) for the maximum sensitivity was able to be found by six searches. On the other hand, in a case where a sensitivity model using uncorrected signal intensity data is used as reference information, it is necessary to perform 13 searches to find a condition for the maximum sensitivity (parameter value). By correcting the signal intensity data in this manner, it is possible to reduce the number of times of measurement required to find optimum device parameters and to improve the efficiency of measurement work.

From the above results, it has been confirmed that the correction of the signal intensity data using the signal intensity obtained by the reference measurement is effective in shortening the time required for the automatic adjustment of the device parameters. In addition, reducing the number of times of measurement at the time of automatic adjustment of the device parameters is also useful for reducing the injection amount of the sample and the consumption amount of the mobile phase, various gases, and the like.

The LC-MS according to the above embodiment uses the ESI ion source as an ion source, but may be a mass spectrometer using an ion source based on other ionization methods such as an atmospheric pressure chemical ionization (APCI) method, an atmospheric pressure photoionization (APPI) method, a probe electrospray ionization (PEST) method, and an ionization method in a real-time direct analysis (DART) method. In addition, the mass spectrometer is not limited to a single type mass spectrometer such as a quadrupole mass spectrometer. Obviously, the present invention can be applied to a triple quadrupole mass spectrometer, a quadrupole-time-of-flight mass spectrometer, an ion trap time-of-flight mass spectrometer, and the like.

Furthermore, the above embodiments and modifications are merely examples of the present invention, and it is a matter of course that changes, modifications, additions, and the like appropriately made within the scope of the gist of the present invention are included in the claims of the present application.

VARIOUS ASPECTS

The embodiments of the present invention have been described above with reference to the accompanying drawings. Finally, various aspects of the present invention will be described.

A mass spectrometer according to the first aspect of the present invention is a mass spectrometer including an ionization unit, a mass separation unit, and a detection unit, the mass spectrometer including:

a first measurement control unit configured to control the ionization unit, the mass separation unit, and the detection unit so as to repeatedly execute a first measurement on a target sample while changing values of a plurality of parameters defined as device parameters;

a second measurement control unit configured to control the ionization unit, the mass separation unit, and the detection unit so as to set a value of each of the plurality of parameters to a predetermined reference value and execute a second measurement on the target sample at not less than two time points before, after, or in a middle of repetition of the first measurement;

a correction processing unit configured to correct results of the first measurements by using results of the second measurements executed at not less than two time points; and a device parameter-related information acquisition unit configured to determine the plurality of parameters using the measurement results corrected by the correction processing unit or acquire reference information for determining the plurality of parameters.

A mass spectrometry method according to the first aspect of the present invention is a mass spectrometry method uses a mass spectrometer including an ionization unit, a mass separation unit, and a detection unit, the mass spectrometry method including:

a first measurement step of repeatedly executing a first measurement on a target sample while changing values of a plurality of parameters defined as device parameters;

a second measurement step of setting a value of each of the plurality of parameters to a predetermined reference value and executing a second measurement on the target sample at not less than two time points before, after, or in a middle of repetition of the first measurement;

a correction processing step of correcting results of the first measurements by using results of the second measurements executed at not less than two time points; and a device parameter-related information acquisition step of determining the plurality of parameters using the measurement results corrected in the correction processing step or acquiring reference information for determining the plurality of parameters.

According to the mass spectrometer and the mass spectrometry method according to the first aspect of the present invention, even in a case where the first measurement is repeated for a long time and a temporal change in signal intensity due to various factors cannot be ignored, it is possible to reduce or substantially eliminate the influence of such a temporal change and obtain device parameters that allows highly sensitive measurement. Alternatively, since the accuracy of the reference information for determining the device parameter can be improved, the number of repetitions of measurement can be reduced when determining the device parameters by repetition of measurement based on the reference information. That is, it is possible to efficiently obtain device parameters allowing highly sensitive measurement.

In a mass spectrometer according to the second aspect of the present invention, a result of the first measurement corrected by the correction processing unit in the mass spectrometer according to the first aspect can be the signal intensity obtained from the height or area of a peak on a chromatogram.

The term "chromatogram" as used herein is a graph reflecting a temporal change in ionic strength and includes graphs indicating temporal changes in ionic strength obtained in not only a case where a sample is introduced from a chromatograph to a mass spectrometer but also a case where a sample is introduced to a mass spectrometer by a flow injection analysis (FIA) method and a case where the same sample is repeatedly introduced to a mass spectrometer like an ion source by a probe electrospray ionization method.

A mass spectrometer according to the third aspect of the present invention includes, in the mass spectrometer according to the first aspect, a reference value search time measurement control unit configured to control the ionization unit, the mass separation unit, and the detection unit so as to repeatedly execute measurement on a target sample while changing a value of one parameter or values of a plurality of parameters that influence ionization efficiency in the ionization unit among the plurality of parameters, and a reference value determination unit configured to determine the reference value based on results of the measurements.

In a mass spectrometer according to the fourth aspect of the present invention, one parameter or a plurality of parameters that influence the ionization efficiency in the ionization unit in the mass spectrometer according to the third aspect can include a parameter whose physical quantity is temperature.

According to the mass spectrometers according to the third and fourth aspects of the present invention, since device parameters at the time of reference measurement are appropriately determined, the reproducibility and stability of the signal intensity of the reference measurement itself are improved, and the accuracy of the correction processing based on the result of the reference measurement is improved. As a result, it is possible to search for device parameters with which higher detection sensitivity can be obtained, or it is possible to efficiently search for device parameters with which higher detection sensitivity can be obtained.

In a mass spectrometer according to the fifth aspect of the present invention, the device parameter-related information acquisition unit in the mass spectrometer according to the first aspect uses the measurement results corrected by the correction processing unit to create, as the reference information, a sensitivity model indicating a relationship between values of a plurality of parameters and detection sensitivity.

In a mass spectrometer according to the sixth aspect of the present invention, the sensitivity model in the mass spectrometer according to the fifth aspect can be a model that is referred to when an optimal or nearly optimal device parameter is searched for using an algorithm of a multi-task Bayesian optimization method.

In a mass spectrometer according to the seventh aspect of the present invention, the device parameter-related information acquisition unit in the mass spectrometer according to the sixth aspect can create the sensitivity model by a Gaussian process regression based on the measurement results corrected by the correction processing unit.

In the mass spectrometers according to the fifth to seventh aspects of the present invention, an optimal or nearly optimal device parameter is searched for by an algorithm of a multi-task Bayesian optimization method referring to a highly accurate sensitivity model. This makes it possible to find an optimal or nearly optimal device parameter with a small number of searches, thereby improving the measurement efficiency and suppressing the injection amount of sample. This leads to saving consumption materials such as a mobile phase and a gas.

REFERENCE SIGNS LIST

1 . . . Measurement Unit
2 . . . Liquid Chromatograph Unit
3 . . . Mass Spectrometry Unit
31 . . . Ion Source
310 . . . Chamber
311 . . . Ionization Chamber
312 . . . ESI Probe
3121 . . . Capillary
3122 . . . Nebulizing Gas Tube
3123 . . . Heating Gas Tube
3124 . . . Interface Heater
3125 . . . High-voltage Power Supply
313 . . . Desolvation Tube
314 . . . Dry Gas Tube
315 . . . Desolvation Tube Heater
316 . . . Block Heater
32 . . . Mass Separation Unit
33 . . . Detection Unit
4 . . . Control Unit
41 . . . First Measurement Control Unit
42 . . . Second Measurement Control Unit
43 . . . Reference Value Search Time Measurement Control Unit
44 . . . Device Parameter Automatic Adjustment Time Measurement Control Unit
45 . . . Device Parameter Storage Unit
46 . . . Third Measurement Control Unit
5 . . . Data Processing Unit
51 . . . Data Storage Unit
52 . . . Peak Detection Unit
53 . . . Data Correction Processing Unit
54 . . . Sensitivity Model Creation Unit
55 . . . Device Parameter Determination Unit
56 . . . Reference Value Determination Unit

The invention claimed is:

1. A mass spectrometer including an ionization unit, a mass separation unit, and a detection unit, the mass spectrometer comprising:

a first measurement control unit configured to control the ionization unit, the mass separation unit, and the detection unit so as to repeatedly execute a first measurement on a target sample while changing values of a plurality of parameters defined as device parameters;

a second measurement control unit configured to control the ionization unit, the mass separation unit, and the detection unit so as to set a value of each of the plurality of parameters to a predetermined reference value and execute a second measurement on the target sample at not less than two time points before, after, or in a middle of repetition of the first measurement;

a correction processing unit configured to correct results of the first measurements by using results of the second measurements executed at not less than two time points; and a device parameter-related information acquisition unit configured to determine the plurality of parameters using the measurement results corrected by the correction processing unit or acquire reference information for determining the plurality of parameters.

2. The mass spectrometer according to claim 1, wherein a result of the first measurement corrected by the correction processing unit is signal intensity obtained from a height or area of a peak on a chromatogram.

3. The mass spectrometer according to claim 1, further comprising:

a reference value search time measurement control unit configured to control the ionization unit, the mass separation unit, and the detection unit so as to repeatedly execute measurement on a target sample while changing a value of one parameter or values of a plurality of parameters that influence ionization efficiency in the ionization unit among the plurality of parameters; and a reference value determination unit configured to determine the reference value based on results of the measurements.

4. The mass spectrometer according to claim 3, wherein one or a plurality of parameters that influence ionization efficiency in the ionization unit include a parameter whose physical quantity is temperature.

5. The mass spectrometer according to claim 1, wherein the device parameter-related information acquisition unit uses the measurement result corrected by the correction processing unit to create, as the reference information, a sensitivity model indicating a relationship between values of a plurality of parameters and detection sensitivity.

6. The mass spectrometer according to claim 5, wherein the sensitivity model is a model that is referred to when an optimal or nearly optimal device parameter is searched for using an algorithm of a multi-task Bayesian optimization method.

7. The mass spectrometer according to claim 6, wherein the device parameter-related information acquisition unit creates the sensitivity model by Gaussian process regression based on the measurement result corrected by the correction processing unit.

8. A mass spectrometry method using a mass spectrometer including an ionization unit, a mass separation unit, and a detection unit, the mass spectrometry method comprising:

a first measurement step of repeatedly executing a first measurement on a target sample while changing values of a plurality of parameters defined as device parameters;

a second measurement step of setting a value of each of the plurality of parameters to a predetermined reference value and executing a second measurement on the target sample at not less than two time points before, after, or in a middle of repetition of the first measurement;

a correction processing step of correcting results of the first measurements by using results of the second measurements executed at not less than two time points; and a device parameter-related information acquisition step of determining the plurality of parameters using the measurement result corrected in the correction processing step or acquiring reference information for determining the plurality of parameters.

* * * * *